United States Patent [19]

Taguchi

[11] Patent Number: 5,062,102
[45] Date of Patent: Oct. 29, 1991

[54] ECHO CANCELLER WITH MEANS FOR DETERMINING FILTER COEFFICIENTS FROM AUTOCORRELATION AND CROSS-CORRELATION COEFFICIENTS

[75] Inventor: Tetsu Taguchi, Tokyo, Japan
[73] Assignee: NEC Corporation, Japan
[21] Appl. No.: 445,187
[22] Filed: Dec. 1, 1989

[30] Foreign Application Priority Data

Dec. 1, 1988 [JP] Japan .................. 63-305247

[51] Int. Cl.$^5$ ............................................ H04M 9/08
[52] U.S. Cl. .................... 370/32.1; 379/388; 379/410; 379/406
[58] Field of Search .............. 370/32.1, 24; 379/388, 379/410, 406; 375/58; 455/303

[56] References Cited

U.S. PATENT DOCUMENTS

| | | | |
|---|---|---|---|
| 4,539,674 | 9/1985 | Carlqvist et al. | 370/32.1 |
| 4,562,312 | 12/1985 | Duttweiler | 370/32.1 |
| 4,571,719 | 2/1986 | Carlqvist et al. | 370/32.1 |
| 4,785,445 | 11/1988 | Guidoux | 370/32.1 |
| 4,891,801 | 1/1990 | Marcos et al. | 370/32.1 |
| 4,937,813 | 6/1990 | Schenk | 370/32.1 |
| 4,956,838 | 9/1990 | Gilloire et al. | 370/32.1 |

FOREIGN PATENT DOCUMENTS

| | | | |
|---|---|---|---|
| 0333581 | 9/1989 | European Pat. Off. | 370/32.1 |
| 2109207 | 5/1983 | United Kingdom | 370/32.1 |

*Primary Examiner*—Douglas W. Olms
*Assistant Examiner*—Dang Ton
*Attorney, Agent, or Firm*—Laff, Whitesel, Conte & Saret

[57] ABSTRACT

In a data transmission system where a first signal partially leaks as an echo from a first transmission line to a second transmission line through a hybrid circuit to form a mixed signal of the echo and a second signal on the second transmission line, an echo canceller is used for cancelling the echo by producing an echo replica at a transversal filter according to filter coefficients and subtracting the echo replica from the mixed signal. In order to reliably generate the filter coefficient for a reduced time duration, a series of autocorrelation coefficients of the first signal and a series of cross-correlation coefficients between the first and the mixed signals are calculated at calculators and the filter coefficients are determined from both of the autocorrelation and the cross-correlation coefficient series at a coefficient determining circuit. The coefficient determining circuit may be an arithmetic circuit for solving simultaneous linear equations. Another circuit for determining the filter coefficients may be a circuit where a first filter coefficient is determined by detecting the maximum value and the corresponding delay time from the series of cross-correlation coefficients, making a fresh series of cross-correlation coefficients with reference to the maximum values, the delay time and the first filter coefficient, then, determining a second filter coefficient from the fresh series. Then, filter coefficients are determined by repetition of the similar operation.

4 Claims, 7 Drawing Sheets

ECHO CANCELLER WITH MEANS FOR DETERMINING FILTER COEFFICIENTS FROM AUTOCORRELATION AND CROSS-CORRELATION COEFFICIENTS

BACKGROUND OF THE INVENTION

1. Field of the Invention

The present invention relates to an echo canceller for use in a two-way data transmission system.

2. Description of the Prior Art

In a conventional two-way data transmission system, a first and a second data transmission line are coupled to a third data transmission line through a hybrid circuit. A first signal is transmitted from the first transmission line to the third transmission line through the hybrid circuit, while a second signal is transmitted in an opposite direction, that is, from the third transmission line to the second transmission line through the hybrid circuit. The first signal partially leaks to the second transmission line through the hybrid circuit as an echo which is mixed with the second signal to form a mixed signal. In order to cancel the echo from the mixed signal, an echo canceller has been used.

Generally, the echo canceller comprises filter means such as transversal filter coupled to the first transmission line and responsive to the first signal for producing an echo replica or an estimated echo signal determined in accordance with the filter coefficients, and subtracting means coupled to the filter means and connected in the second transmission line for subtracting the estimated echo signal from the mixed signal on the second transmission line so that the echo is cancelled from the mixed signal to deliver the second signal through the second transmission line. The echo canceller also comprises coefficient generating means for generating the filter coefficients so as to determine the estimated echo signal. That is, the echo concellation is defined by performance of the coefficient generating means.

In the prior art, the learning identification such as the steepest descent method has been used for determining the filter means. According to the learning identification, the optimum filter coefficients are accurately determined by use of signal waveforms over a long time duration, but it takes a long time for obtaining the filter means. Further, the identification tends to be interrupted by existence of local peak and/or local minimum so that it is not insured to obtain the optimum filter coefficients.

SUMMARY OF THE INVENTION

It is an object of the present invention to provide an echo canceller which is able to provide the optimum filter coefficients for a reduced or short time duration.

The present invention is applicable to an echo canceller for use in a data transmission system for transmitting a first signal in a direction through a first transmission line and a second signal in an opposite direction through a second transmission line, the first signal partially leaking from the first transmission line to the second transmission line as an echo and mixing with the second signal to form a mixed signal. The echo canceller comprises filter means coupled to the first transmission line and responsive to the first signal for producing an estimated echo signal determined in accordance with filter coefficients, coefficient generating means for generating the filter coefficients, and subtracting means coupled to the filter means and connected in the second transmission line for substracting the estimated echo signal from the mixed signal on the second transmission line so as to cancel the echo. According to the present invention, the coefficient generating means comprises: first means coupled to the first transmission line and responsive to the first signal for producing a series of autocorrelation coefficients of the first signal; second means coupled to the first and the second transmission lines and responsive to the first and the second signals for producing a series of cross-correlation coefficients between the first signal and the mixed signal; and third means coupled to the first and the second means for generating the filter coefficients from the autocorrelation and cross-correlation coefficients to deliver the filter coefficients to the filter means.

According to another aspect of the present invention, the third means comprises: memory means coupled to the second means for memorizing the series of cross-correlation coefficients at memory locations therein, respectively; optimum coefficient determining means coupled to the first means and the memory means for detecting the maximum one in the series of cross-correlation coefficients memorized in the memory means and a specific one of the memory locations where the maximum cross-correlation coefficient is memorized, the optimum coefficient determining means determining an optimum delay time from the specific memory location and an optimum filter coefficient corresponding to the maximum cross-correlation coefficient and the optimum delay time, the optimum coefficient determining means repeating the detecting and determining operations in response to a control signal; and coefficient converting means coupled to the first means, memory means, and optimum coefficient determining means for converting the series of cross-correlation coefficients into a converted series of coefficients with reference to the maximum cross-correlation coefficient, the specific memory location, the optimum filter coefficient, and the series of autocorrelation coefficients, the coefficient converting means delivering the converted coefficients to the memory means so as to rewrite the memory means by the converted series of coefficients as the series of cross-correlation coefficients, the converting means delivering the control signal when the rewriting is completed.

DESCRIPTION OF PREFERRED EMBODIMENTS

Prior to description of the preferred embodiments, description will be made as to general arrangement and operation of the data transmission system with an echo canceller so as to help better understanding of the present invention.

Figure 1:
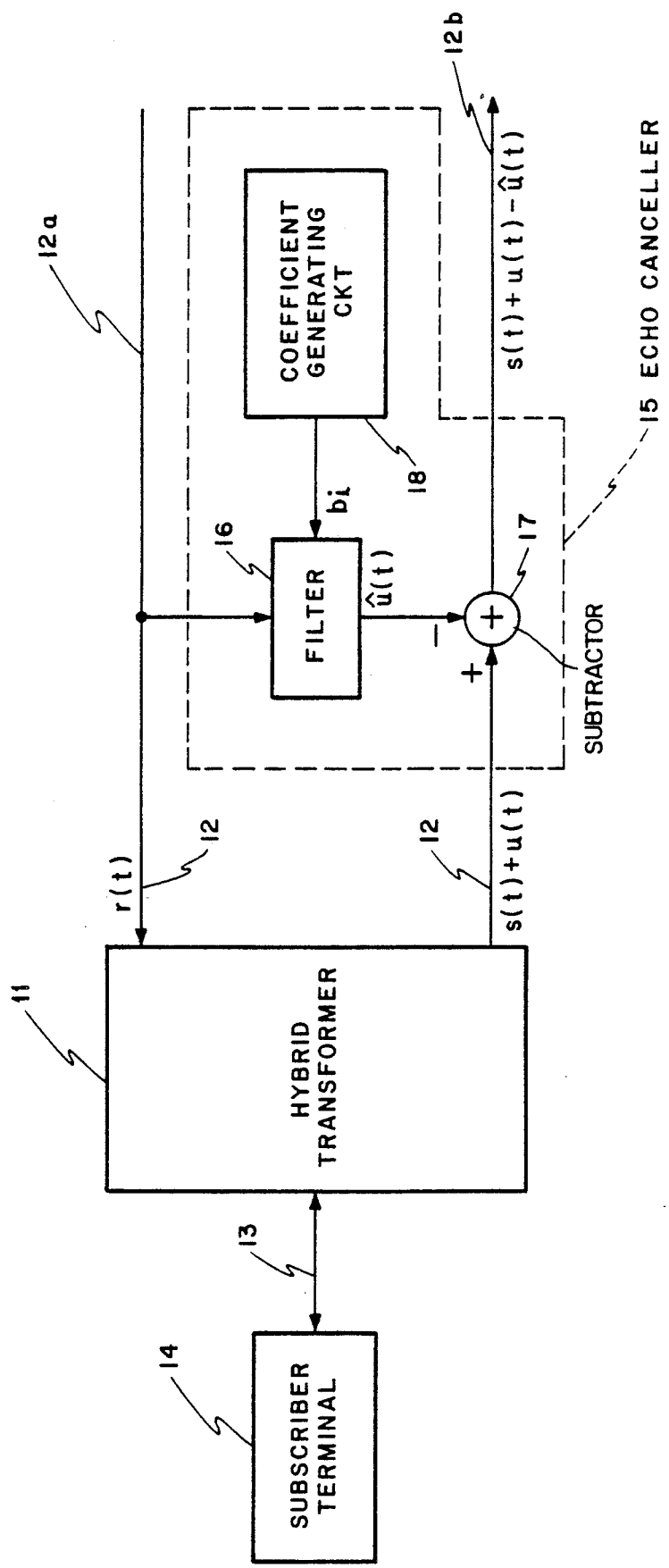
FIG. 1 is a block diagram view illustrating a data transmission line with an echo canceller for explaining operation of the echo canceller.

Referring to FIG. 1, a hybrid transformer 11 is used for coupling a four-wire two-way transmission line 12 and a two-wire two-way transmission line 13. The four-wire two-way transmission line 12 comprises a first transmission line 12a and a second transmission line 12b each being a two-wire one-way transmission line. A subscriber terminal 14 is connected to an extended end of the two-wire two-way transmission line 13.

In operation, an incoming data signal propagates as a first signal r(t) through the first transmission line 12a and is transmitted to the two-wire two-way transmission line 13 towards the subscriber terminal 14 through the hybrid transformer 11, A part of the first signal leaks to the second transmission line 12b through the hybrid transformer 11 as an leakage signal u(t) which is called "echo." On the other hand, a signal sent out from the subscriber terminal 14 to the two-way transmission line 13 is transmitted to the second transmission line 12b through the hybrid transformer 11 as a transmission signal. The transmission signal is transmitted through the second transmission line 12b as a second signal s(t). Then, the second signal is mixed with the echo on the second transmission line 12b to form a mixed signal (s(t)+u(t)). The echo u(t) should be cancelled from the mixed signal so as to transmit the second signal s(t) alone.

In order to cancel the echo from the mixed signal, an echo canceller 15 is connected in the four-wire transmission line 12. The echo canceller 15 comprises a filter 16 such as a transversal filter coupled to the first transmission line 12a and responsive to the first signal r(t) for producing an echo replica or an estimated echo signal û(t) determined in accordance with the filter coefficients $b_i$ (i=0, 1, ...). A subtracter 17 is coupled to the filter 16 and connected in the second transmission line 12b for subtracting the estimated echo signal û(t) from the mixed signal (s(t)+u(t)) on the second transmission line 12b so that the echo u(t) is reduced or cancelled from the mixed signal (s(t)+u(t)) to deliver the second signal through the second transmission line 12b. The echo canceller 15 also comprises coefficient generating circuit 18 for generating the filter coefficients $b_i$ so as to determine the estimated echo signal û(t). If the coefficient generating circuit 18 can generate the optimum filter coefficients so as to provide û(t)=u(t), the echo is completely cancelled. When u(t)≠û(t), (u(t)−û(t)) still remains as a residual echo. That is, the echo cancellation is defined by performance of the coefficient generating circuit 18.

Figure 2:
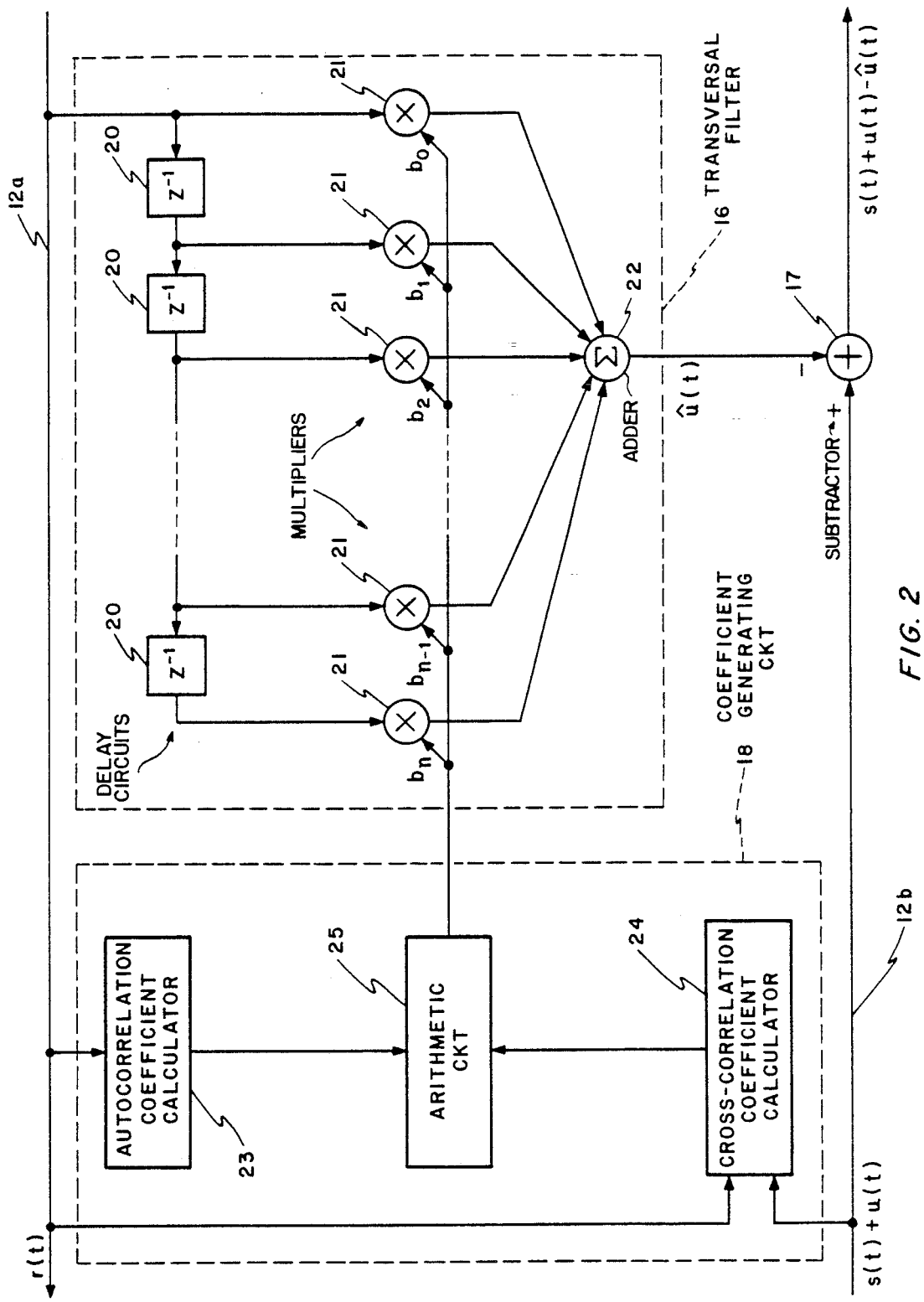
FIG. 2 is a block diagram view illustrating an echo canceller according to an embodiment of the present invention.

Referring to FIG. 2, an echo canceller shown therein is one according to an embodiment of the invention and comprises a transversal filter 16 connected to the first transmission line 12a, a subtracter 17 coupled to the transversal filter 16 and connected to a second transmission line 12b, and a coefficient generating circuit 18 for delivering filter coefficients $b_0, b_1, \ldots b_n$. The transversal filter 16 comprises n (n being an integer) T-second delay circuits 20, (n+1) multipliers 21 for producing tap gains, and an adder 22. The delay time T is determined to a value of 1/Z where Z is a symbol rate of the first signal r(t). The tap gains are determined by multiplying outputs of the delay circuits 20 and the filter coefficients $b_0, b_1, \ldots b_n$ at the multipliers 21 and can be controlled by the filter coefficients $b_i$ provided by the coefficient generating circuit 18. The tap gains are added by the adder 22 to one another to produce an added signal as the estimated echo signal û(t).

In the shown embodiment, the coefficient generating circuit 18 comprises a first, a second, and a third circuit 23, 24 and 25. The first circuit 23 is coupled to the first transmission line 12a and calculates an autocorrelation coefficient R of the first signal r(t). The second circuit 24 is coupled to the first and the second transmission lines 12a and 12b and calculates a cross-correlation coefficient φ between the first signal r(t) and the mixed signal (s(t)+u(t)). Accordingly, the first and the second circuits 23 and 24 are an autocorrelation coefficient calculator and a cross-correlation coefficient calculator, respectively.

The third circuit 25 is coupled to the autocorrelation coefficient calculator 23 and the cross-correlation coefficient calculator 24 and decides the filter coefficients $b_0, b_1, \ldots b_n$ from a series of autocorrelation coefficients R and a series of cross-correlation coefficient φ time-serially provided from the autocorrelation coefficient calculator 23 and the cross-correlation coefficient calculator 24, respectively. Therefore, the third circuit 25 is called a filter coefficient decision circuit.

Now, description will be made to operation of the first, the second, and the third circuits 23, 24, and 25 by use of a mathematical method.

It is generally known in the prior art that the first signal r(t) and the echo u(t) of the first signal r(t) are linearly coupled each other. Therefore, u(t) is represented by a linear coupling of the following equation (1) using a coupling coefficient $b_i$:

$$u(t) = \sum_{i=0}^{n} r(t-i) \cdot b_i. \tag{1}$$

The cross-correlation coefficient φ(j) (j=0, 1, 2, ...) between the first signal r(t) and the mixed signal (s(t)+u(t)) is given by the following equation (2):

$$\phi(j) = \sum_{i=0}^{m} s(t-i) + u(t-i)r(t-i-j). \tag{2}$$

Since r(t) and s(t) has no correlation, Equation (2) can be rewritten as a form of the following equation (3) providing that m is sufficiently large:

$$\phi(j) \approx \sum_{i=0}^{m} u(t-i) \cdot r(t-i-j). \tag{3}$$

When u(t−i) in Equation (3) is rewritten in the manner of Equation (1), Equation (3) is rewritten as follows:

$$\begin{aligned}\phi(j) &\approx \sum_{i=0}^{m}\left(\sum_{k=0}^{n} r(t-i-k) \cdot b_k\right) r(t-i-j) \\ &= \sum_{k=0}^{n} b_k \sum_{i=0}^{m} r(t-i-k) \cdot r(t-i-j) \\ &= \sum_{k=0}^{n} b_k \cdot R(j-k).\end{aligned} \tag{4}$$

$R(j-k)$ in Equation (4) is known as the autocorrelation of $r(t)$ at a time delay of $(j-k)$ and is calculated at the autocorrelation calculator 23.

Equation (4) is also rewritten by use of matrix representation for $j=0, 1, \ldots n$ as given by the following equation (5):

$$\begin{bmatrix} R(0) & R(-1) & R(-2) & \ldots & R(-n) \\ R(1) & R(0) & R(-1) & \ldots & R(1-n) \\ R(2) & R(1) & R(0) & \ldots & R(2-n) \\ \cdot & \cdot & \cdot & & \cdot \\ \cdot & \cdot & \cdot & & \cdot \\ \cdot & \cdot & \cdot & & \cdot \\ R(n) & R(n-1) & R(n-2) & \ldots & R(0) \end{bmatrix} \begin{bmatrix} b_0 \\ b_1 \\ b_2 \\ \cdot \\ \cdot \\ \cdot \\ b_n \end{bmatrix} = \begin{bmatrix} \phi(0) \\ \phi(1) \\ \phi(2) \\ \cdot \\ \cdot \\ \cdot \\ \phi(n) \end{bmatrix} \quad (5)$$

Since $R(1)=R(-1)$, Equation (5) is also rewritten as follows:

$$\begin{bmatrix} R(0) & R(1) & R(2) & \ldots & R(n) \\ R(1) & R(0) & R(1) & \ldots & R(n-1) \\ R(2) & R(1) & R(0) & \ldots & R(n-2) \\ \cdot & \cdot & \cdot & & \cdot \\ \cdot & \cdot & \cdot & & \cdot \\ \cdot & \cdot & \cdot & & \cdot \\ R(n) & R(n-1) & R(n-2) & \ldots & R(0) \end{bmatrix} \begin{bmatrix} b_0 \\ b_1 \\ b_2 \\ \cdot \\ \cdot \\ \cdot \\ b_n \end{bmatrix} = \begin{bmatrix} \phi(0) \\ \phi(1) \\ \phi(2) \\ \cdot \\ \cdot \\ \cdot \\ \phi(n) \end{bmatrix} \quad (6)$$

Equation (6) is simultaneous linear equations for $b_0$ through $b_n$. Values or solutions of $b_0$ through $b_n$ can be obtained by solving the simultaneous linear equations (6) and are the filter coefficients to be delivered to the transversal filter 16.

When $(n+1)$ is not greater than 10 $((n+1)\leq 10)$, the simultaneous linear equations can directly be solved by a mathematical calculation.

The series of autocorrelation coefficients $R(0)$ through $R(n)$ and the series of cross-correlation coefficients $\phi(0)$ through $\phi(n)$ are provided to the third circuit 25 from the autocorrelation coefficient calculator 23 and cross-correlation coefficient calculator 24, respectively. Therefore, the third circuit 25 in the embodiment of FIG. 2 is an arithmetic circuit for directly solving the simultaneous linear equations.

In FIG. 2, the third circuit or the arithmetic circuit 25 solves the simultaneous linear equations by use of the series of autocorrelation coefficients $R(0)$ through $R(n)$ and the series of cross-correlation coefficients $\phi(0)$ through $\phi(n)$ which are provided to the third circuit 25 from the autocorrelation coefficient calculator 23 and cross-correlation coefficient calculator 24, and delivers the values of $b_0$ through $b_n$ to the transversal filter 16 as the filter coefficients.

Thus, the transversal filter 16 produces the estimated echo signal $\hat{u}(t)$ according to the filter coefficients given. The estimated echo signal $\hat{u}(t)$ is applied to the subtractor 17 which, in turn, subtracts the estimated echo signal $\hat{u}(t)$ from the mixed signal $(s(t)+u(t))$ to produce a signal $(s(t)+u(t)-\hat{u}(t))$. When $\hat{u}(t)=u(t)$, the echo signal is completely cancelled.

When $(n+1)$ is greater than 10 $((n+1)>10)$, it is impossible to directly solve the simultaneous linear equations (6). However, it is possible to determine values of $b_0$ through $b_n$ one after another in a manner as described below.

Providing that one of filter coefficients is $\hat{b}_h$ at a time delay h, an optimum value of $\hat{b}_h$ is determined so that a power P of a residual echo $(\hat{u}(t)-\hat{b}_h r(t-h-i))$ is minimum. The power P is represented by the following equation (7):

$$P = \sum_{i=0}^{m} \{u(t-i) - \hat{b}_h r(t-h-i)\}^2 \quad (7)$$

$$\frac{\partial}{\partial b_h} P = \sum_{i=0}^{m} 2\{u(t-i) - \hat{b}_h r(t-h-i)\} \quad (8)$$

$$\{-r(t-h-i)\}$$

$$\therefore \hat{b}_h = \frac{\sum_{i=0}^{m} u(t-i) \cdot r(t-h-i)}{\sum_{i=0}^{m} \{r(t-h-i)\}^2} = \frac{\phi(h)}{R(0)}. \quad (9)$$

It is noted that the optimum value of $\hat{b}_h$ is proportional to $\phi(h)$ which is a cross-correlation coefficient at the delay time h. Therefore, the optimum time delay $h_0$ for minimizing the power P of Equation (7) is given by a value of h which gives the maximum value of $|\phi(h)|$. When the value of $h_0$ is determined, the optimum value $\hat{b}_{h0}$ of $\hat{b}_h$ is determined. As a result, the residual echo at $h_0$ is given by $(u(t)-\hat{b}_{h0}(t-h_0 i))$.

Now, considering a cross-correlation coefficient $\phi_1(j)$ between $r(t)$ and $(s(t)+u(t)-\hat{b}_{h0}r(t-h_0-i))$, it is represented by the following equation (10):

$$\phi_1(j) = \sum_{i=0}^{m} \{s(t-i) + u(t-i) - \hat{b}_{h0}r(t-h_0-i)\} \quad (10)$$

$$r(t-i-j)$$

$$= \phi(j) - \hat{b}_{h0} \sum_{i=0}^{m} r(t-h_0-i) \cdot r(t-j-i)$$

$$= \phi(j) - \hat{b}_{h0} R(j-h_0)$$

An optimum value $h_1$ of a time delay for minimizing $(u(t)-\hat{b}_{h0}(t-h_0-i))$ is determined by j at which $|\phi_1(j)|$ is maximum, and a filter coefficient $\hat{b}_{h1}$ at the time delay $h_1$ is then determined. The coefficient $\hat{b}_{h1}$ is represented by replacement of $\hat{b}_h$ and $\phi(h)$ in Equation (9) by $\hat{b}_{h1}$ and $\phi_1(h_1)$.

In repetition of the similar manner, filter coefficients $\hat{b}_{h2}, \ldots \hat{b}_{hn}$ are obtained one after another.

Figure 3:
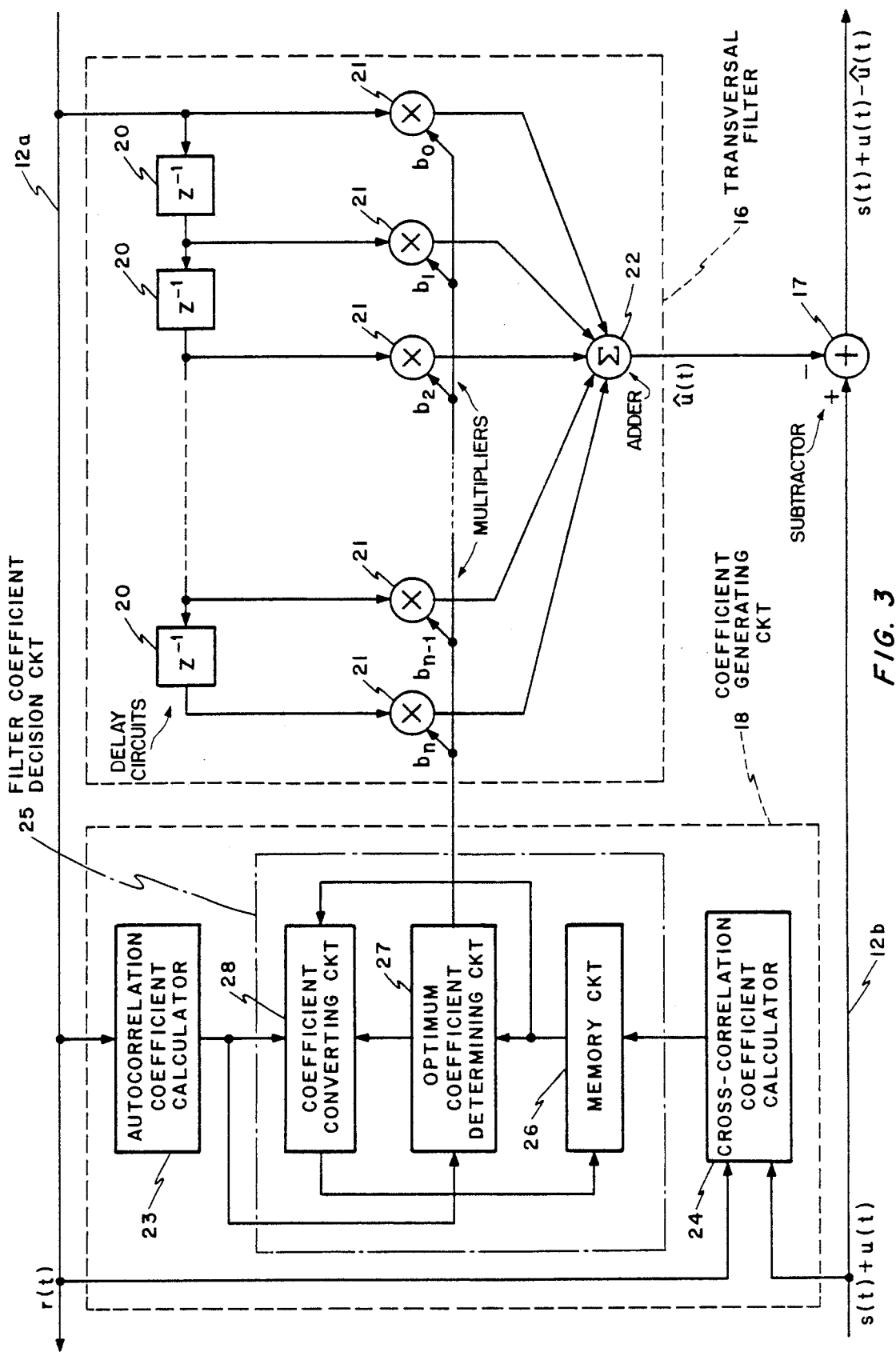
FIG. 3 is a block diagram view illustrating an echo canceller according to another embodiment of the present invention.

Referring to FIG. 3, the echo canceller shown therein is another embodiment wherein the values of $\hat{b}_{h0}$ through $\hat{b}_{hn}$ are obtained by the above-described indirect method.

The echo canceller of FIG. 3 is similar to that of FIG. 2 and the similar portions are designated by the same reference numerals in FIG. 2. According to the present embodiment, the filter coefficient decision circuit 25 comprises a memory circuit 26 for memorizing a series of cross-correlation coefficients $\phi(0)$ through $\phi(n)$ which are calculated at the cross-correlation coefficient calculator 24 and an optimum coefficient determining circuit 27. The optimum coefficient determining circuit 27 detects a maximum value $\phi(h_0)$ in the series of $\phi(0)$ through $\phi(n)$ and an optimum delay time $h_0$ from a memory location where the maximum value $\phi(h_0)$ is memorized. Further, the optimum coefficient determining circuit 27 calculates the filter coefficient $\hat{b}_{h0}$ in Equation (9) by use of an autocorrelation coefficient R(0) provided from the autocorrelation coefficient calculator 23.

A coefficient converting circuit 28 is coupled to the autocorrelation coefficient calculator 23, the memory circuit 26, and the optimum coefficient determining circuit 27 and converts the cross-correlation coefficients $\phi(0)$ through $\phi(n)$ into $\phi_1(0)$ through $\phi_1(n)$ by use of the optimum filter coefficient $\hat{b}_{h0}$ and the autocorrelation coefficients R(0) through R(n). The converted cross-correlation coefficients $\phi_1(0)$ through $\phi_1(n)$ are supplied to the memory circuit 26.

After completion of rewriting of the memory circuit 26 into the converted cross-correlation coefficients $\phi_1(0)$ through $\phi_1(n)$, the optimum coefficient determining circuit 27 again operates to determine $h_1$ and $\hat{b}_{h1}$ in the similar manner as described above. Then, the coefficient converting circuit 28 again operates to convert $\phi_1(0)$ through $\phi_1(n)$ into $\phi_2(0)$ through $\phi_2(n)$ which are stored to the memory circuit 26. The similar manner is repeated and the filter coefficients $\hat{b}_{h0}$ through $\hat{b}_{hn}$ are obtained and delivered to the transversal filter 16.

Now, description will be made as to detail of various portions of the coefficient generating circuit 18 in FIG. 3 with reference to FIGS. 4-8.

Figure 4:
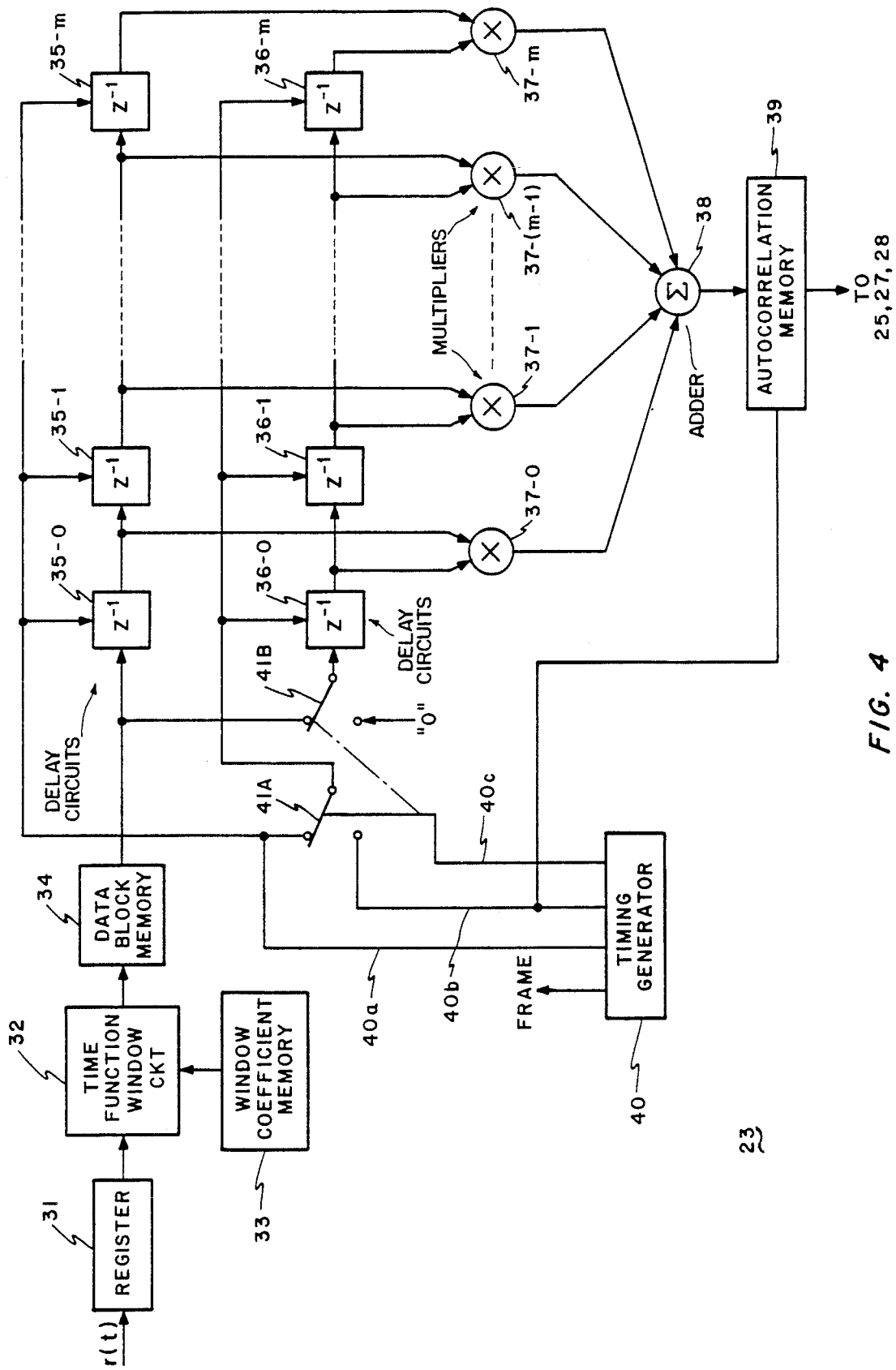
FIG. 4 is a block diagram view illustrating an autocorrelation coefficient calculator in FIG. 3, in detail.

Referring to FIG. 4, the autocorrelation coefficient calculator 23 shown therein comprises a register 31, a time function window circuit 32, a window coefficient memory 33, a data block memory 34, a set of delay elements 35-0 through 35-m cascaded, another set of delay elements 36-0 through 36-m, a set of multipliers 37-0 through 37-m, an adder 38, a memory 39 for memorizing autocorrelation coefficient (which will be called autocorrelation memory), a timing generator 40, and two switches 41A and 41B.

In operation, the first signal r(t) is applied to the register 31. The register 31 temporarily holds the first signal as sampled data which comprises (m+1) time-serially sampled signals of the first signal and delivers the sampled data at every frame as a block of data. The block of data is applied to the data block memory 34 through the time function window circuit 32.

The time function window circuit 32 and the window coefficient memory 33 are actually used for avoiding effect from discontinuity of frame waveforms so as to obtain accurate autocorrelation coefficients. However, they are unnecessary for description of principal operation for obtaining the autocorrelation coefficients. The time function window circuit 32 and the window coefficient memory 33 are well known in the art.

At a time of (t−h), the data block memory 34 stores the block of data which is represented by r(t−h−i) (i=−m, −(m−1), ..., −1, 0) from the register 31 and stores the block of data and delivers (m+1) sampled signals one after another in order of i and in synchronism with timing signal 40a produced by the timing generator 40.

Figure 5:
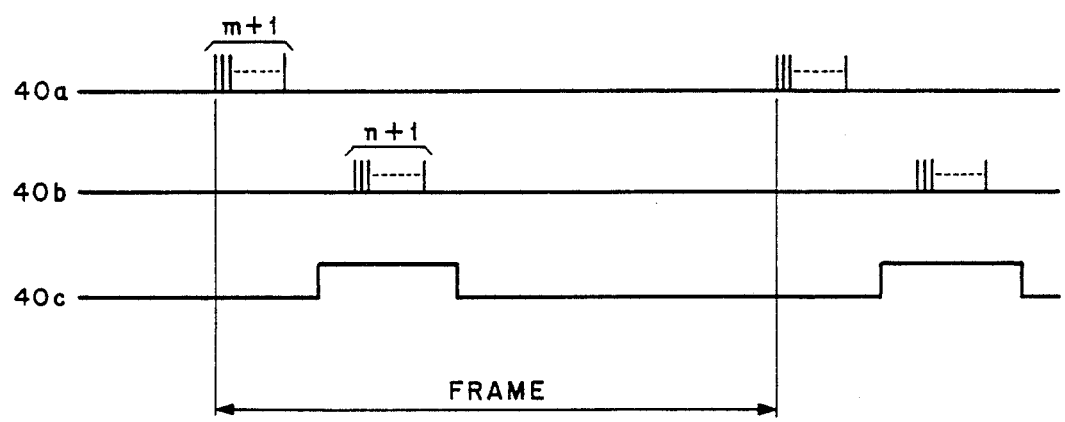
FIG. 5 is a view illustrating timing signals used in the autocorrelation calculator of FIG. 4.

The timing generator 40 generates a first timing signal 40a, a second timing signal 40b, a third timing signal 40c and a frame signal. The first through third timing signals 40a-40c are shown in FIG. 5.

Switches 41A and 41B are connected as shown in the figure and are controlled by the third timing signal 40c.

In the shown condition of the switches 41A and 41B, the first timing signal 40a are supplied with all of the delay elements 35-0 through 35-n and 36-0 through 36-n as clock signals.

The data r(t−h−i) delivered from the data block memory 34 are stored in the delay elements 35-0 through 35-n and 36-0 through 36-n in synchronism with the first timing signals 40a, so that r(t−h) is stored in both of delay elements 35-0 and 36-0 which are paired, r(t−h−1) being in delay elements 35-1 and 36-1 which are paired, and r(t−h−m) being in delay elements 35-m and 36-m which are paired.

The multipliers 37-0 through 37-m are supplied with outputs from pairs of the delay elements (35-0, 36-0) through (35-m, 36-m), respectively, and produce products by multiplication. The products are supplied to the adder 39 to form a sum of the products. The sum is represented by the following equation (11):

$$R(0) = \sum_{i=0}^{m} r(t - h - i)^2. \quad (11)$$

The sum is supplied as the autocorrelation coefficient to and stored in the autocorrelation memory 39 in synchronism with the first pulse from the second timing signal 40b which comprises (n+1) pulses.

The switches 41A and 41B are switched by the third timing signals 40c in each frame so that the second timing signal 40b is applied to the delay elements 36-0 through 36-m in place of the first timing signal 40a as the clock signal, with "0" being applied to the delay elements 36-0 through 36-m in place of the delivered data r(t−h−i) from the data block memory 34.

The contents in the delay elements 36-0 through 36-m are shifted from one to another in synchronism with the second timing signal 40b so that r(t−h−0), r(t−h−1), ..., r(t−h−(m−1)) are shifted to the delay elements 36-1, 36-2, ..., 36-m, respectively, upon the first pulse of the second timing signal 40b. At that time, "0" is stored in the delay element 36-0. Then, the output of the adder 38 is represented by R(1) of the following equation (12):

$$R(1) = r(t - h - 0) * 0 + r(t - h - 1) * r(t - h - 0) + \quad (12)$$
$$\ldots + r(t - h - m) * r(t - h - m) = \sum_{i=0}^{m-1} r(t - h - m) * r(t - h - m - 1).$$

R(1) is stored in the autocorrelation memory 39 in synchronism with the second pulse of the second timing signal 40b.

By repetition of the similar operation, R(2), R(3), ..., R(n) are stored to the autocorrelation memory 39 in synchronism with successive pulses of the second timing signal 40b.

The autocorrelation coefficients R(0) through R(n) are delivered to the filter coefficient decision circuit 25 as an output of the autocorrelation coefficient calculator 23 from the autocorrelation memory 39 at each frame.

Figure 6:
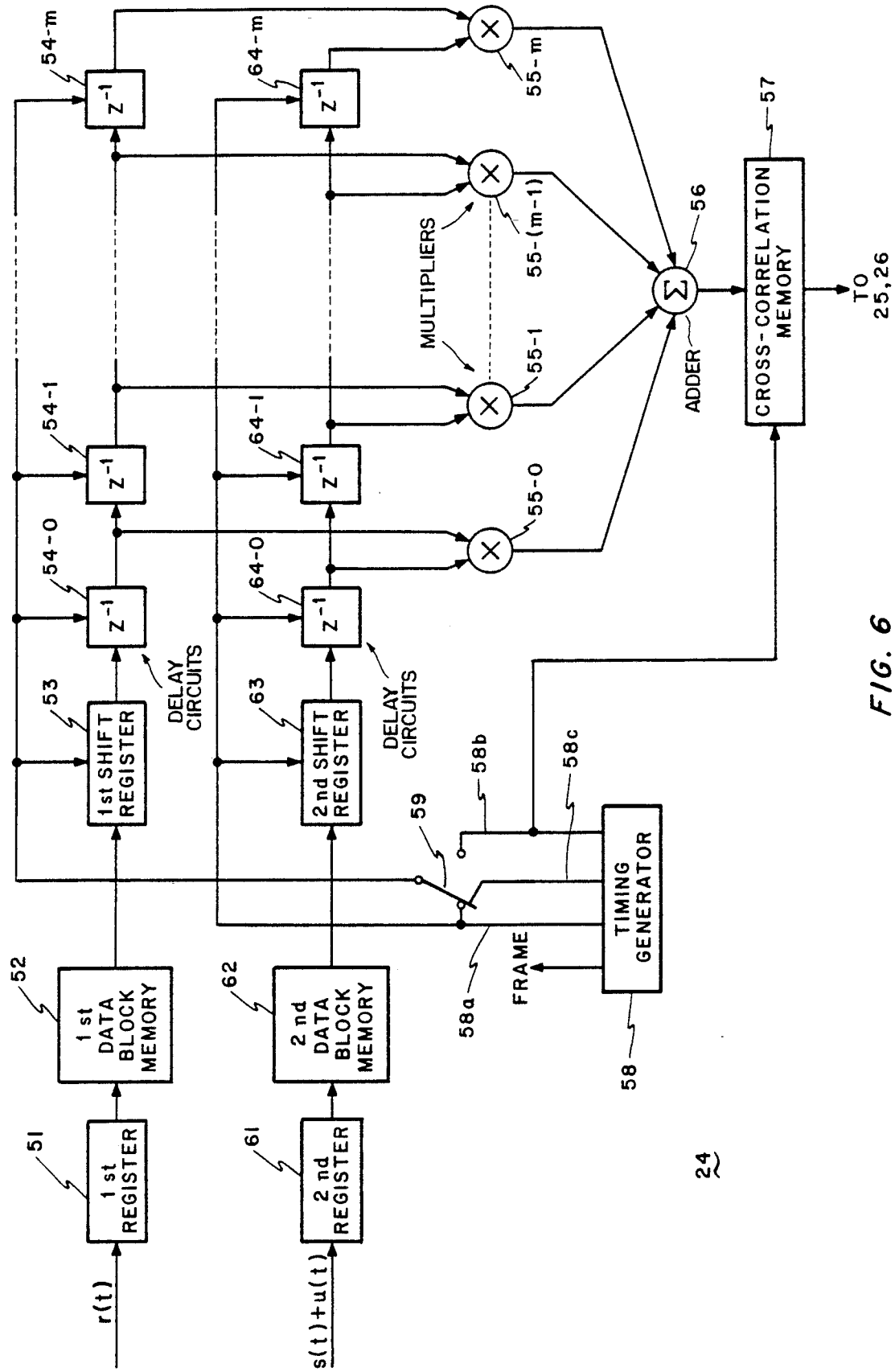
FIG. 6 is a block diagram view illustrating a cross-correlation coefficient calculator in FIG. 3, in detail.

Referring to FIG. 6, the cross-correlation coefficient calculator 24 shown therein is similar to the autocorrelation coefficient calculator 23. That is, the cross-correlation coefficient calculator 24 comprises a first register 51, a first data block memory 52, a set of delay elements 54-0 through 54-m, another set of delay elements 64-0 through 64-m, a plurality of multiplier 55-0 through 55-m coupled to the sets of delay elements, an adder 56, a memory 57, a timing generator 58, and a switch 59, all of which are corresponding to the register 31, the data block memory 34, a set of delay elements 36-0 through 36-m, another set of delay elements 35-0 through 35-m, a plurality of multipliers 37-1 through 37-m coupled to the sets of delay elements, the adder 38, the memory 39, the timing generator 40, and the switch 41A in the circuit 23 of FIG. 4, respectively.

The circuit 24 of FIG. 6 is a calculator for obtaining the cross-correlation coefficients between the first signal r(t) and the mixed signal (s(t)+u(t)). Therefore, the block of data of the first signal r(t) is supplied to the set of delay elements 54-0 through 54-m from the first data block memory 52 in the similar manner in FIG. 4 but through a first shift register 53. The circuit 24 further comprises a second register 61 and a second data block memory 62 for preparing a block of data or sampled signals of the mixed signals in the similar manner as the block of data of first signal r(t). The block of data are supplied to the set of delay elements 64-0 through 64-m through a second shift register 63. The circuit 24 does not have a switch corresponding to the switch 41B in FIG. 4. Therefore, the block of data of first signal and the block of data of the mixed signal are supplied to the sets of delay elements 54-0 through 54-m and 64-0 through 64-m, respectively, without changing to application of other signals thereto.

Figure 7:
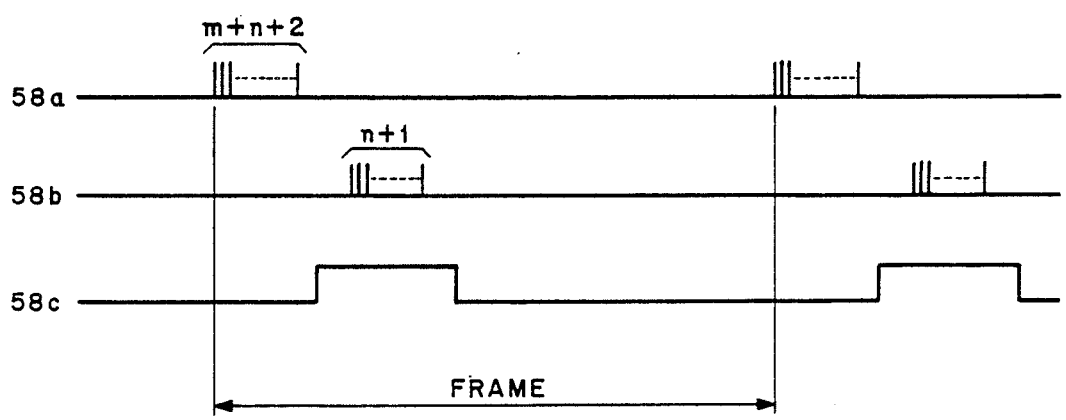
FIG. 7 is a view illustrating timeing signals used in the cross-correlation calculator of FIG. 6.

The timing generator 58 generates a first, a second, and a third timing signals 58a, 58b and 58c and a frame signal as shown in FIG. 7. It will be noted from comparison with FIGS. 5 and 7 that those signals 58a-58c are similar to those 40a-40c generated by the timing generator 40.

Thus, the circuit 24 operates in the similar manner of the circuit 23 of FIG. 4, and cross-correlation coefficients $\phi(0), \phi(1), \ldots, \phi(n)$ between the first signal and the mixed signal are produced from the adder 56 one after another in synchronism with the second timing signal 58b and are stored in the memory 57. Therefore, the memory 57 is called a cross-correlation memory.

The cross-correlation coefficients $\phi(0)$ and $\phi(1)$ are represented by the following equations (13) and (14):

$$\phi(0) = \sum_{i=0}^{m} \{s(t-i) + u(t-i)\}r(t-i) \quad (13)$$

$$\phi(1) = \sum_{i=0}^{m} \{s(t-i) + u(t-i)\}r(t-i-1). \quad (14)$$

The autocorrelation coefficient calculator of FIG. 4 and the cross-correlation coefficient calculator of FIG. 6 are also used for the circuits 23 and 24 in FIG. 2, respectively.

Figure 8:
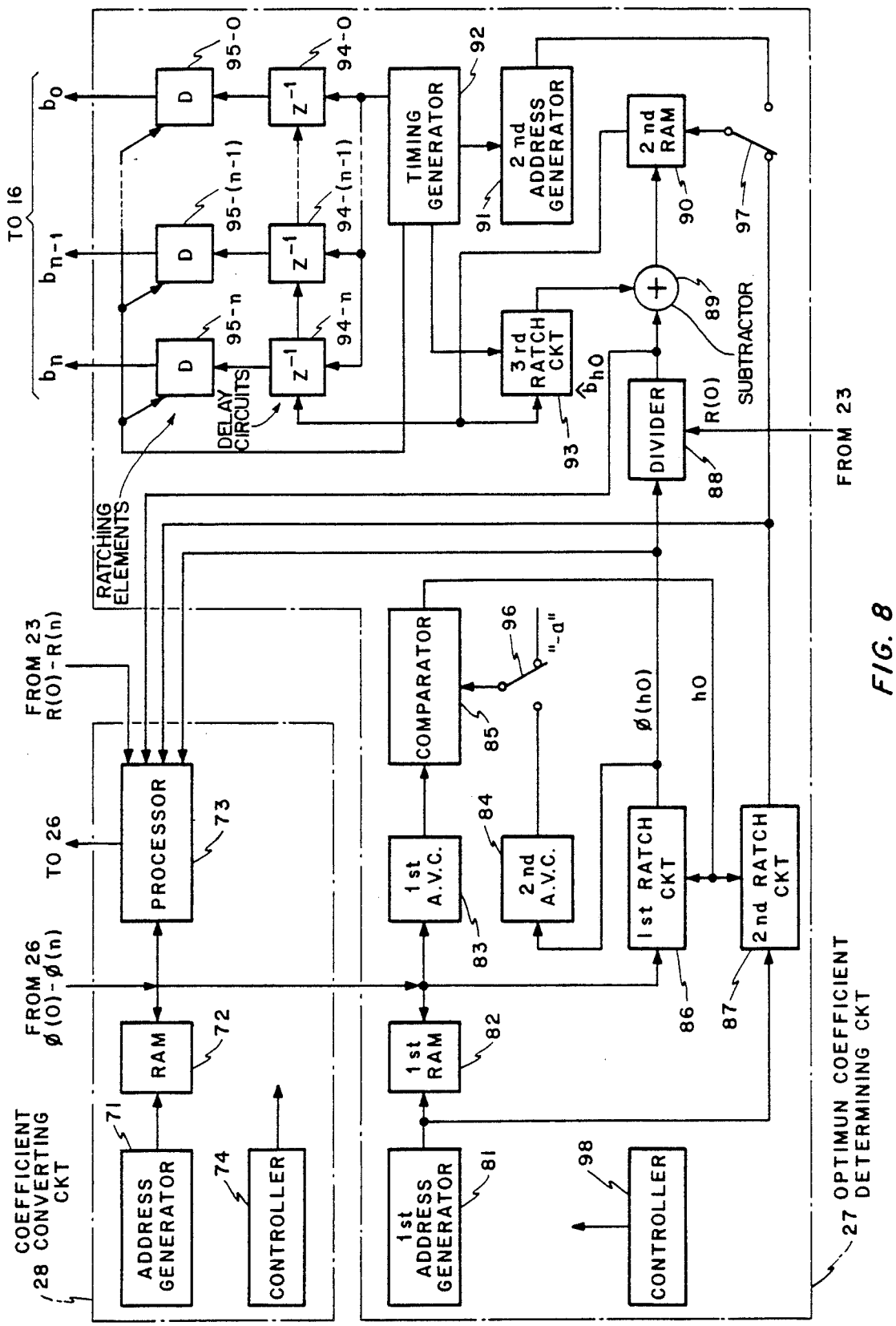
FIG. 8 is a are block diagram view illustrating in detail an optimum coefficient determining circuit and a coefficient converting circuit in FIG. 3.

Referring to FIG. 8, the coefficient converting circuit 28 comprises an address generator 71, a random access memory (RAM) 72, a microprocessor 73, and a controller 73 for controlling the address generator 71, the RAM 72 and the microprocessor 26.

The optimum coefficient determining circuit 27 comprises a first address generator 81, a first RAM 82, a first and a second absolute value calculator 83 and 84, a comparator 85, a first and a second ratching circuit 86 and 87, a divider 88, an adder 89, a second RAM 90, a second address generator 91, a timing generator 92, a third ratching circuit 93, a set of delay elements 94-n through 94-0, a set of ratching elements 95-n through 95-0, two switches 96 and 97, and a controller 98.

In the coefficient converting circuit 28, the address generator 71 is set to have an initial address of "2n+1". At first, autocorrelation coefficients are read in a order of R(n), R(n−1), ..., and R(0) from the autocorrelation memory (39 in FIG. 4) in the autocorrelation coefficient calculator 23 to the processor 73 and are stored in RAM 72 according to the addresses "2n+1" through "n+1" from the address generator 71. That is, the address generator 71 generates an address number decremented according to one writing operation to RAM 72 by the processor 73. Thereafter, the address of the address generator 71 is "n".

The first address generator 81 in optimum coefficient determining circuit 27 is preliminarily set to be "n" as an initial address.

A series of cross-correlation coefficients are read out from the memory circuit 26 (FIG. 3) in the order of $\phi(n), \phi(n-1), \ldots,$ and $\phi(0)$ and are stored in "n" to "0" addresses of the RAM 72 and also "n" to "0" addresses of the first RAM 82 according to the addresses delivered from the address generators 71 and 81, respectively. Then, the first address generator 81 is again set to be "n".

Thereafter, the cross-correlation coefficients are read from the first RAM 82 according to the addresses from the first address generator 81 under control of the controller 98. At first, $\phi(n)$ is read out and is supplied to the first absolute value calculator 83 and the first ratching circuit 86. The first absolute value calculator 83 calculates $|\phi(n)|$ which is then supplied to the comparator 85.

The comparator 85 compares $|\phi(n)|$ with "−a" ("a" is an integer) which is supplied to the comparator 85 through the switch 96. Since $-a < |\phi(n)|$, the comparator 86 produces a pulse which is applied to the first and the second ratching circuits 86 and 87. As a result, the first and the second ratching circuits 86 and 87 holds $\phi(n)$ and "n" from the first RAM 82 and the first address generator 81, respectively.

Then, the controller 98 changes the switch 96 to connect the second absolute value calculator 84 to the comparator 85. Thus, the address generator 81 provides an address "n−1". As a result, $\phi(n-1)$ is read from the first RAM 82 and $|\phi(n-1)|$ is calculated at the first absolute calculator 83 and is applied to the comparator 85. On the other hand, $\phi(n)$ ratched in the first ratching circuit 86 is supplied to the second absolute value calculator 84 and a calculated absolute value $|\phi(n)|$ is also supplied to the comparator 85 through the switch 96. The comparator 85 compares $|\phi(n-1)|$ and $|\phi(n)|$ and produces a pulse to the first and the second ratching circuits 86 and 87 only when $|\phi(n-1)| > |\phi(n)|$. As a result, the first ratching circuit 86 ratches max$\{|\phi(n)|, |\phi(n-1)|\}$ and the second ratching circuit 87 ratches a corresponding one of "n" or "n−1".

Then, $\phi(n-2), \ldots, \phi(0)$ are read from the first RAM 82 according to addresses from the first address generator 81 and are processed by the first and the second absolute value calculators 83 and 84, the first ratching circuit 86, the comparator 85 and the switch 96 in the similar manner. As a result, the first ratching circuit 86 ratches max$\{|\phi(n)|, |\phi(n-1)|, \ldots, |\phi(0)|\}$ and the second ratching circuit 87 ratches the coresponding one of the addresses "n", "n−1", ..., "0".

Now, providing the following equation (15):

$$|\phi(h_0)| = \max\{|\phi(n)|, |\phi(n-1)|, \ldots, |\phi(0)|\} \quad (15)$$

outputs of the first and the second ratching circuits 86 and 87 are $\phi(h_0)$ and $h_0$, respectively, and supplied to the divider 88 and the second RAM 90, respectively, also to processor 73 in the coefficient converting circuit 28.

The divider 88 receives R(0) from the autocorrelation coefficient calculator 23 and $\phi(h_0)$ from the first ratching circuit 86 and produces $\phi(h_0)/R(0)$ as $\hat{b}_{h0}$ according to Equation (9). $\hat{b}_{h0}$ is supplied to the adder 89 and the processor 73 in the coefficient converting circuit 28.

The second RAM 90 has (n+1) memory locations having addresses of "0" to "n". "0" is preliminarily memorized in all of the memory locations. When $h_0$ is applied to the second RAM 90 through switch 90 from the second ratching circuit 87, "0" is read out from a memory location of the address $h_0$ in the second RAM 90 and is applied to the third ratching circuit 93. The ratching circuit 93 ratches "0" and applies "0" to the adder 89.

The adder 89 produces a sum of two inputs, that is, $\hat{b}_{h0}$ and "0" and the sum ($\hat{b}_{h0}$) is memorized at the memory location $h_0$ of the second RAM 90.

In the coefficient converting circuit 28, the controller 74 controls the address generator 71 to generate an address $h_0$, when $h_0$ is applied to the processor 73 from the second ratching circuit 87 in the optimum coefficient determining circuit 27. Then, reading operation of RAM 72 is performed so that one of the cross-correlation coefficients $\phi(j)$ is read out from an address of $h_0$ in the RAM 72 to the processor 73 as $\phi(h_0)$.

Then, the controller 74 again controls the address generator 71 to generates the address "n+1". Accordingly, one of the autocorrelation coefficients R(0) is read out from the address of "n+1" in the RAM 72 to the processor 73. The processor 73 processes calculation of the following equation (16):

$$\phi(h_0) = \phi(h_0) - \hat{b}_{h0} \cdot R(0) \quad (16)$$

and writes a processed result into the address of $h_0$ in the processor 72.

Thereafter, the controller 74 controls the address generator 71 so that data of $\phi(h_0+1)$, $\phi(h_0-1)$, and R(1) are read out from addresses of "$h_0+1$", "$h_0-1$", and "1" in the RAM 72. Then, the processor 73 processes calculation of the following equation (17):

$$\phi(h_0+1) = \phi(h_0+1) - \hat{b}_{h0} \cdot R(1)$$

$$\phi(h_0-1) = \phi(h_0-1) - \hat{b}_{h0} \cdot R(1) \quad (17)$$

Two results are written to addresses "$h_0+1$" and "$h_0-1$" in the RAM 72. Thus, it will be noted that contents in the addresses of "0" to "n" in the RAM 72 are rewritten by the results of Equations (10) as a converted series of cross-correlation coefficients in the RAM 72. The converted series of cross-correlation coefficients are read out from the RAM 72 and are written in the first RAM 82.

The above-described operation is repeated so that detection of the maximum value is performed by a desired number of times. As a result, data in the addresses of "0" to "n" of the second RAM 90 are $b_0, b_1, \ldots, b_n$.

Thereafter, the controller 98 in the optimum coefficient determining circuit 27 controls the switch 97 to connect the second address generator 91 to the second RAM 90. The second address generator 91 generates address data "0", ..., "n" in response to a timing signal from the timing generator 92. Thus, the data $b_0, b_1, \ldots, b_n$ are read out from the second RAM 90 one after another and supplied to the delay elements 94-$n$ through 94-0, respectively, by shifting operation of the delay elements 94-$n$ through 94-0, in response to the timing signal from the timing generator 92. The data $b_0, b_1, \ldots, b_n$ are supplied to from the delay elements 94-0 through 94-$n$ to the ratching circuits 95-0 through 95-$n$, respectively, and are ratched thereat. The data $b_0, b_1, \ldots, b_n$ are supplied from the ratching circuits 95-0 through 95-$n$ to the transversal filter 16 as the filter coefficients.

What is claimed is:

1. In an echo canceller for use in a data transmission system for transmitting a first signal in a direction through a first transmission line and a second signal in an opposite direction through a second transmission line, said first signal partially leaking from said first transmission line to said second transmission line as an echo and mixing with said second signal to form a mixed signal, said echo canceller comprising filter means coupled to said first transmission line and responsive to said first signal for producing an estimated echo signal determined in accordance with filter coefficients, coefficient generating means for generating said filter coefficients, and subtracting means coupled to said filter means and connected in said second transmission line for subtracting said estimated echo signal from said mixed signal on said second transmission line so as to cancel said echo, the improvement wherein said coefficient generating means comprises:

first means coupled to said first transmission line and responsive to said first signal for producing a series of autocorrelation coefficients of said first signal;

second means coupled to said first and said second transmission lines and responsive to said first and said mixed signals for producing a series of cross-correlation coefficients between said first signal and said mixed signal; and third means coupled to said first and said second means for generating said filter coefficients from said autocorrelation and cross-correlation coefficients to deliver said filter coefficients to said filter means.

2. An echo canceller as claimed in claim 1, wherein said filter means is a transversal filter.

3. An echo canceller as claimed in claim 1, wherein said third means is an arithmetic circuit for solving simultaneous linear equations of a plurality of linear constants, said series of autocorrelation and said series of cross-correlation coefficients to produce solutions of said linear constants as said filter coefficients.

4. An echo canceller as claimed in claim 1, wherein said third means comprises;

memory means coupled to said second means for memorizing said series of cross-correlation coefficients at memory locations therein, respectively;

optimum coefficient determining means coupled to said first means and said memory means for detecting the maximum one in said series of cross-correlation coefficients memorized in said memory means and a specific one of said memory locations where said maximum cross-correlation coefficient is memorized, said optimum coefficient determining means determining an optimum delay time from said specific memory location and an optimum filter coefficient corresponding to said maximum cross-correlation coefficient and said optimum delay time, said optimum coefficient determining means repeating the detecting and determining operations in response to a control signal; and coefficient converting means coupled to said first means, memory means, and optimum coefficient determining means for converting said series of cross-correlation coefficients into a converted series of coefficients with reference to said maximum cross-correlation coefficients, said specific memory location, said optimum filter coefficient, and said series of autocorrelation coefficients, said coefficient converting means delivering said converted coefficients to said memory means so as to rewrite the memory means by said converted series of coefficients as said series of cross-correlation coefficients, said converting means delivering said control signal when the rewriting is completed.

\* \* \* \* \*